United States Patent [19]

Smith

[11] 4,021,268

[45] May 3, 1977

[54] THERMOCOUPLE ASSEMBLY WITH A SHEATH

[75] Inventor: Eugene G. Smith, Long Beach, Calif.

[73] Assignee: Robertshaw Controls Company, Richmond, Va.

[22] Filed: Oct. 15, 1975

[21] Appl. No.: 622,556

[52] U.S. Cl. .............................. 136/228; 136/217
[51] Int. Cl.² ...................................... H01L 35/04
[58] Field of Search ............... 136/217, 242, 228

[56] References Cited

UNITED STATES PATENTS

| | | | |
|---|---|---|---|
| 3,155,143 | 11/1964 | Jackson et al. | 136/217 X |
| 3,332,808 | 7/1967 | Ray | 136/217 X |
| 3,441,450 | 4/1969 | Frommel | 136/217 |
| 3,522,107 | 7/1970 | Kenyon | 136/217 |
| 3,615,872 | 10/1971 | Braucksiek | 136/217 X |
| 3,650,843 | 3/1972 | Kenyon | 136/217 |
| 3,709,740 | 1/1973 | Kenyon | 136/217 |
| 3,930,891 | 1/1976 | Fox et al. | 136/217 |

*Primary Examiner*—Leland A. Sebastian
*Attorney, Agent, or Firm*—O'Brien & Marks

[57] ABSTRACT

The thermocouple has a sheath attached to an outer thermocouple element of a pair of coaxial thermocouple elements between hot and cold junctions of the thermocouple elements with the sheath extending away from the hot junction.

12 Claims, 4 Drawing Figures

THERMOCOUPLE ASSEMBLY WITH A SHEATH

BACKGROUND OF THE INVENTION

1. Field of the Invention

This invention relates to thermocouples for sensing temperature, and in particular to thermocouples for sensing the presence and absence of a flame from a burner, and to generate EMF to operate safety devices.

2. Description of the Prior Art

The prior art as exemplified in U.S. Pat. Nos. 3,155,143 and 3,615,872 and in FIGS. 1, 2 and 3 includes a number of thermocouple constructions for sensing a flame from a burner.

In FIG. 1, a thermocouple construction indicated generally at 10 is fastened to a bracket indicated generally at 12 which also supports a burner such as a pilot burner indicated generally at 14. The thermocouple 10 has a pair of coaxial elements such as a center rod 16 and an outer tube 18 which are welded together at 20 to form a hot junction. The rod 16 and tube 18 are made from dissimilar metals such as constantan, an alloy containing essentially copper and nickel, and stainless steel, an alloy containing essentially steel and chromium, respectively. The other end of the center element 16 is joined to a conductor, such as being welded to the stripped end of a insulated copper wire 22 to form a junction 24. The tubular element 18 extends from the junction 20 over the element 16, the junction 24, and a portion of the conductor 22 and terminates in a flared end 26 which is joined such as by soldering to a conductor such as a tubular copper conductor 28 coaxial with the insulated wire conductor 22 to form a junction 30. A tubular insulator 32 is disposed between the elements 16 and 18 and extends over the junction 24 and the bare end of the wire conductor 22 to prevent electrical contact to the outer element 18. An annular groove 34 is engaged by a spring clip 36 to retain the thermocouple 10 at a selected position through respective holes in upper and lower flanges of the bracket 12. As illustrated the thermocouple 10 is positioned such that a flame from the burner 14 impinges on the outer tubular element 18 immediately adjacent the junction 20. Thus the junction 20 forms a hot junction of the thermocouple while the junctions 24 and 30 form cold junctions of the thermocouple.

In another prior art arrangement as illustrated in FIG. 2, several parts are identified by the same numbers as parts in FIG. 1 indicating that such commonly identified parts have substantially identical structure and/or function. A thermocouple indicated generally at 40 is mounted in a bracket indicated generally at 42 which supports the burner 14. The thermocouple 40 has an inner element 44 such as a rod of constantan, and an outer element, such as stainless steel tube 46 coaxial with the inner element 44 and joined together at one end to form the hot junction 20. The lower end of the inner element 44 is joined at a junction 48 to the bared end of the insulated wire 22. The lower end of the tubular element 46 is joined at 49, such as by soldering, to the upper end of a coupling member 50 which has a generally tubular configuration coaxial with the inner element 44 and is formed from brass. The coupling member 50 extends over the junction 48 to its lower end where it is joined, such as by soldering, at a junction 52 to the tubular conductor 28. The junctions 48, 49 and 52 form cold junctions for the thermocouple 40.

An insulative sleeve 32 covers the junction 48 and the conductors on either side to prevent electrical shorting in the area of the junction 48. The member 50 has a plurality of annular radiating fins 56 formed therearound and spaced throughout substantial portions of the length of the member 50. An annular rib 57 is disposed around the member 50 for engaging the bottom of an upper flange 58 of the bracket 42 around a hole 60 in the flange 58 through which the member 50 extends. A second annular rib 62 is disposed around the member 50 for being engaged by a nut 64 threaded into a lower flange 66 on the bracket 42. The ribs 57 and 62, the opening 60, the flanges 58 and 66, and the nut 64 are such that the thermocouple 40 is accurately positioned in the bracket 42 relative to the burner 14.

Alternately, the thermocouple 40 is secured to the bracket 42 by other means such as the spring clip described in the aforementioned U.S. Pat. No. 3,615,872 instead of the nut 64.

The thermocouple construction 40 produces a substantially higher output EMF or voltage in the conductors 22 and 28 than the thermocouple construction 10 of FIG. 1. It is noted that the inner element 44 of the thermocouple 40 is substantially longer than the inner element 16 of the thermocouple 10 and that the outer element 46 of the thermocouple 40 is substantially shorter than the outer element 18 of the thermocouple 10. However, the cost of the thermocouple 40 is substantially higher than the cost of the thermocouple 10 due to the member 50 and the labor involved in making the junctions 49 and 52. The higher voltage output of the thermocouple 40 allows for less critical design of electromagnets, energy cut-off switches, meters, and other parts of safety valves or control devices which utilize the current from the thermocouples to maintain the flow of fuel during the presence of a flame from the burner 14 and to stop the flow of fuel during the absence of a flame from the burner 14.

In another thermocouple indicated generally at 70 in FIG. 3, an inner element 72 of constantan is welded at hot junction 20 to a stainless steel sleeve 74 which is coaxial with the inner element 72. An enlarged upper portion 76 of the outer copper conductor 28 is telescoped over and brazed to the lower portion of the sleeve 74 to form a junction 78. The inner conductor 22 is welded to the inner member 72 at the junction 80 within the enlarged portion 76. A tubular steel sheath 82 is attached to the portion 76 of outer conductor 28 by crimping the upper end of the sheath 82 into secure engagement with the portion 76 where it is telescoped over the sleeve 74. The sheath 82 extends completely over the enlarged portion 76 and an upper portion of the outer conductor 28 below the portion 76, and has an upper annular step 84 and a lower annular step 86 which are believed to be bracket engaging and nut engaging steps respectively. It is believed that the sheath 82 is nothing more than an adapter designed for attaching the thermocouple 70 to a selected size and shape of bracket since the sheath 82 has a smooth exterior with no apparent attempt to provide improved heat dissipation.

SUMMARY OF THE INVENTION

The invention is summarized in that a thermocouple includes coaxial inner and outer elongated thermocouple elements formed from respective dissimilar metals and having respective one ends joined to form a hot junction, conductor means of a metal dissimilar from at least one of said inner and outer elements joined to the other ends of the thermocouple elements to form cold junction means, a thermal conductive sheath surrounding the thermocouple elements and joined to the outer thermocouple element between the hot junction and the cold junction means, and radiating means formed on the thermoconductive sheath for radiating heat energy.

An object of the invention is to construct a thermocouple which is relatively inexpensive and produces a relatively high output voltage.

Another object of the invention is to utilize a single thermocouple construction in a variety of applications.

It is also an object of the invention to eliminate one or more soldering operations in the construction of a thermocouple.

An advantage of the invention is that an adapter sheath with radiating means, attached to a first low output thermocouple assembly for adapting it to fit into bracket for a second high output thermocouple assembly substantially increases the voltage output of the first thermocouple thus eliminating the necessity of the second thermocouple.

Other objects, advantages and features of the invention will be apparent from the following description of the preferred embodiment taken in conjunction with the accompanying drawings.

DESCRIPTION OF THE PREFERRED EMBODIMENT

Figure 2:
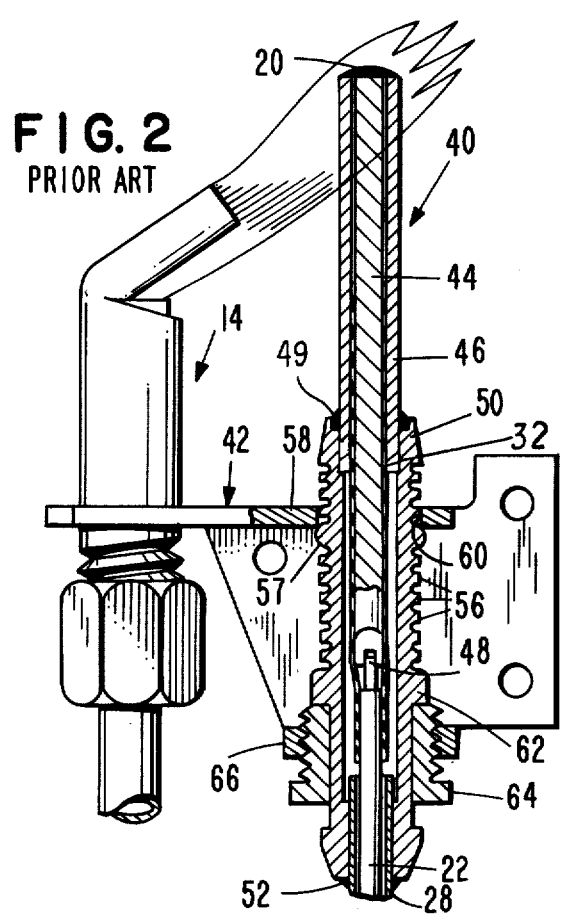
FIG. 2 is a cross sectional elevation view of a second prior art thermocouple construction.
Figure 3:
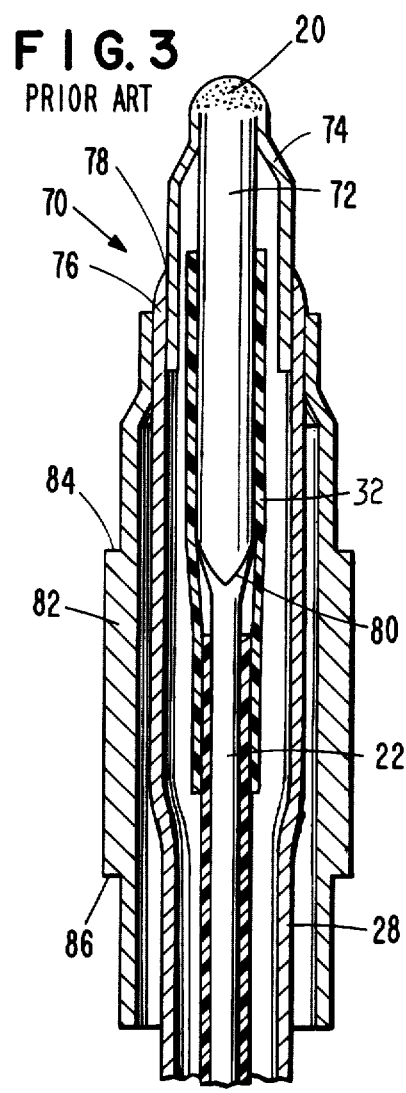
FIG. 3 is an elevational cross section view of a third prior art thermocouple construction.
Figure 4:
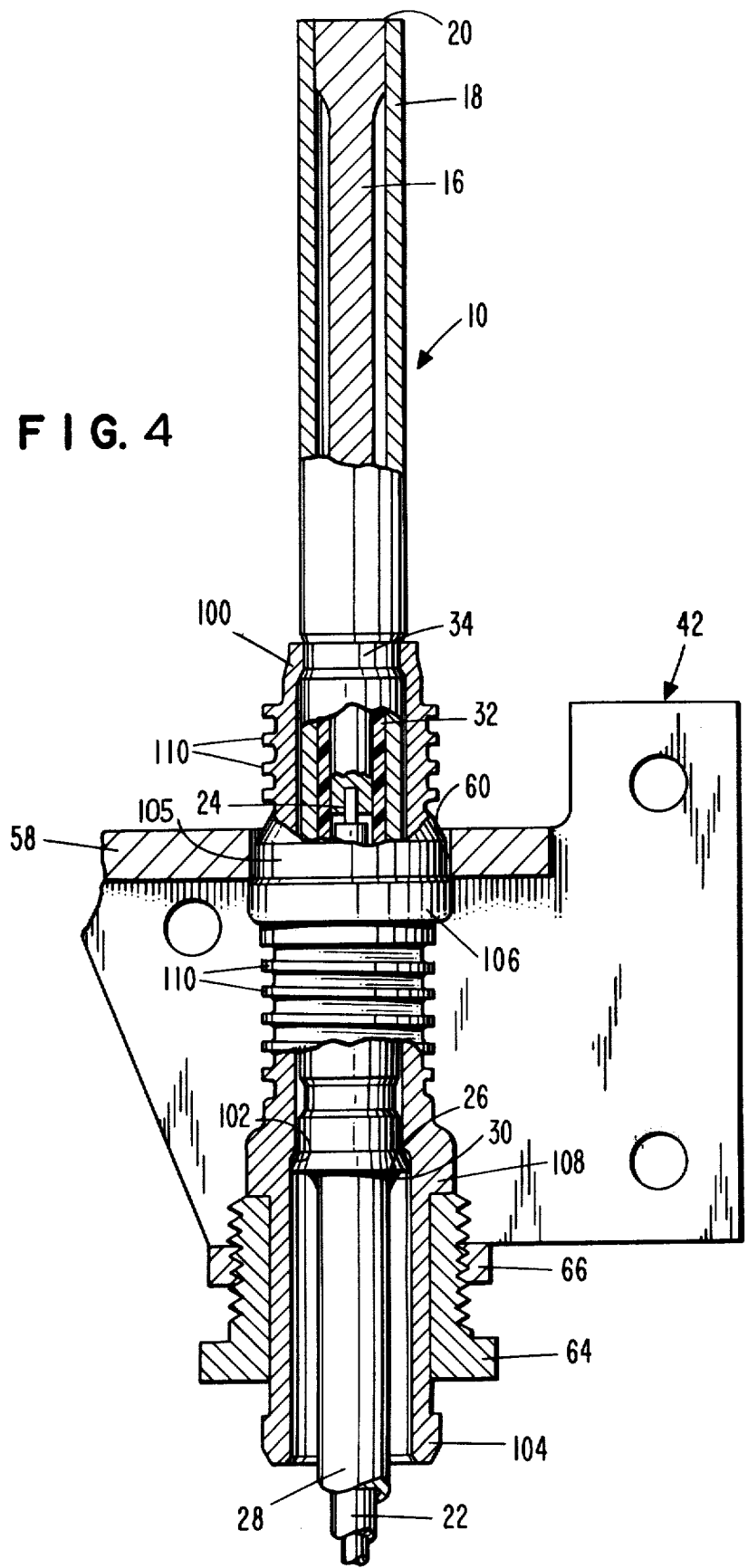
FIG. 4 is an elevational cross section view of a thermocouple construction made in accordance with the invention.

As illustrated in FIG. 4, the invention is embodied in a thermocouple assembly including the prior art thermocouple 10 to which a thermoconductive and adapter sheath or member 100 has been added to enable the installation of the thermocouple 10 in the prior art bracket 42. The member 100 is generally tubular and preferrably is attached by crimping the upper end of the member 100 to engage the outer element 18 in the groove 34. An inside chamfer 102 is formed in the member 100 to engage the flared end of the outside element 18. The member 100 is generally spaced along its length from the outside of element 18 and has a lower end 104 which extends past the lower end of the element 18 over the coaxial conductors 22 and 28. The end 104 is open and spaced relative to the outer conductor 28 such as to prevent short radius bending of the conductor 28 at the junction 30. The member 100 has a cylindrical portion 105 for being positioned in the hole 60, an annular rib 106 contiguous the portion 105 for engaging the upper flange 58 of the bracket 42, and a lower annular rib 108 for being engaged by the end of the nut 64 to secure the member 100 in a selected position in the bracket 42 to extend to the same height as the thermocouple 40 in FIG. 2. Alternately, other means such as spring clips or the like can be used to attach the shield 100 to a bracket. Heat radiating means such as a plurality of spaced radiating annular fins 110, roughened and black surfaces, or the like, extend along a substantial portion of the length of the shield member 100. The member 100 may be made from brass, steel or any other thermoconductive metal having suitable strength and heat conductivity.

It is noted that the shield member 100 is connected to the outer element 18 between the hot junction 20 and the cold junctions 24 and 30.

Figure 1:
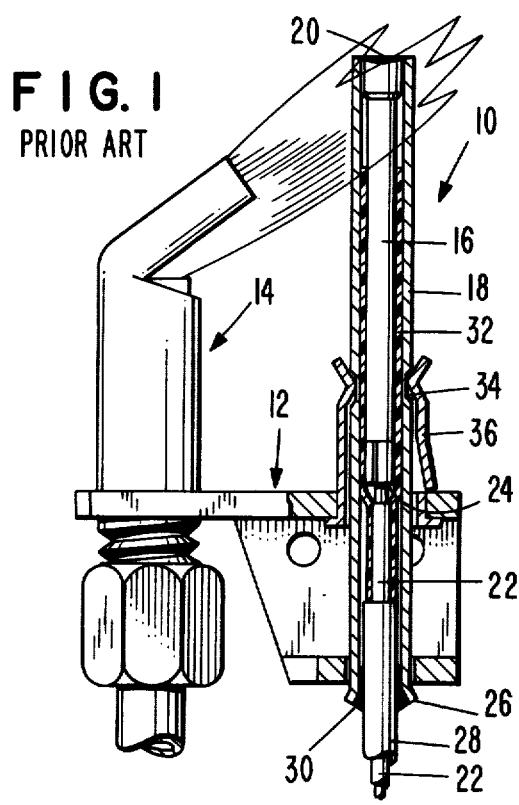
FIG. 1 is a cross sectional elevation view of on prior art thermocouple construction.

It has been found that the particular combination of the member 100 attached to the outer element 18 of the thermocouple 10 between the hot junction 20 and the cold junctions 24 and 30 results in a significant performance improvement. In particular, the output of the thermocouple 10 in the new combination when exposed to the flame of a burner about the junction 20 has been increased by about 6 to 9 percent over the old thermocouple construction of FIG. 1. The combination of the thermocouple 10 with the sheath 100 produces an output voltage which is a little higher or slightly lower, depending on length of the thermocouple 10, than the output voltage of the thermocouple 40 of FIG. 2. Thus it is possible to produce one prior art thermocouple construction, i.e. thermocouple 10, and by adding the sheath 100 to result in a new combination having the performance of more expensive thermocouples.

Since many modifications, variations and changes in detail may be made to the described embodiment, it is intended that all matter in the foregoing description and shown in the accompanying drawings be interpreted as illustrative and not in a limiting sense.

What is claimed is:
1. A thermocouple comprising
coaxial inner and outer elongated thermocouple elements formed from respective dissimilar metals and having respective one ends joined to form a hot junction,
conductor means including inner and outer coaxial conductors of a metal dissimilar from at least one of said inner and outer elements joined to the respective other ends of the inner and outer thermocouple elements to form cold junctions means,
a thermoconductive sheath surrounding the thermocouple elements and being joined to the outer thermocouple element between the hot junction and the junction of the outer thermocouple element to the outer conductor, said junction of the sheath with the outer thermocouple element further being intermediate the hot junction and the junction of the inner thermocouple element to the inner conductor,
radiating means formed on the thermoconductive sheath for radiating heat energy.
2. A thermocouple as claimed in claim 1 wherein the radiating means includes a plurality of fins projecting from the sheath.
3. A thermocouple as claimed in claim 1 wherein the thermoconductive sheath includes bracket engaging means for accurately positioning the thermocouple.
4. A thermocouple as claimed in claim 1 wherein said inner elongated element is a rod,
said outer elongated thermocouple element is a tube,
said conductor means includes a wire conductor joined to the other end of the inner elongated element, and includes a tubular conductor coaxial to the wire conductor and joined to the other end of the outer elongated element.
5. A thermocouple as claimed in claim 4 wherein said thermoconductive sheath is essentially tubular and coaxial with the inner and outer thermocouple elements, and said sheath further has one end attached to the outer element with the sheath extending away from the hot junction and with the other end of the sheath being open and spaced from the outer element.

6. A thermocouple as claimed in claim 5 wherein the one end of the sheath is attached by crimping its one end to the outer element, and a substantial portion of the sheath extending from its one end is spaced from the outer element.

7. A thermocouple as claimed in claim 5 wherein said radiating means includes a plurality of annular fins extending around the sheath.

8. A thermocouple as claimed in claim 5 wherein the sheath includes a cylindrical portion for being positioned in a hole in a locating bracket, a rib contiguous to the cylindrical portion for engaging the locating bracket, and means spaced from the rib for securing the sheath to the bracket.

9. A thermocouple comprising
an elongated center element formed from a first metal,
a solid conductor attached to the one end of the center element to form a first junction,
a tubular element formed from a second metal dissimilar from the first metal and having one end joined to the other end of the center element to form a second junction,
said tubular element extending over the center element and the first junction,
a tubular conductor joined to the other end of the tubular element to form a third junction, said tubular conductor extending coaxial to the solid conductor, and
a sheath joined at one end to the tubular element between the first and second junctions and having its other end extending in spaced relationship over the third junction and tubular conductor.

10. A thermocouple as claimed in claim 9 wherein the first metal is a copper-nickel alloy, the second metal is a steel-chromium alloy, and the solid and tubular conductors are copper conductors.

11. A thermocouple as claimed in claim 9 wherein the sheath includes
radiating means for radiating heat energy, and
bracket engaging means for accurately positioning the thermocouple.

12. A thermocouple adapted for sensing a flame comprising
an elongated constantan center element,
a solid copper conductor welded to one end of the center element to form a first junction of dissimilar metals,
a stainless steel tubular element having one end welded to the other end of the center element to form a second junction of dissimilar metals,
said tubular element having its other end flared and extending coaxial to the center element over the first junction and a portion of the solid conductor,
a tubular copper conductor joined by solder to the other end of the tubular element to form a third junction of dissimilar metals,
said tubular element having an annular groove formed therearound between its one end and the portions of the tubular element surrounding the second junction,
a tubular metal sheath having one end crimped to the annular groove of the tubular element to secure the sheath to the tubular element,
said sheath having an inside chamfer intermediate to its ends for engaging the flared end of the tubular element,
the other end of the tubular sheath extending in spaced relationship over the tubular conductor adjacent the third junction,
said tubular sheath having a plurality of spaced annular radiating fins, and
said tubular sheath further having annular bracket engaging means for accurately positioning the first junction relative to a bracket.

* * * * *